Jan. 26, 1965
J. N. McLAUGHLIN
3,167,055
ANIMAL ACTUATED INSECTICIDE APPLICATOR
Filed Feb. 7, 1963
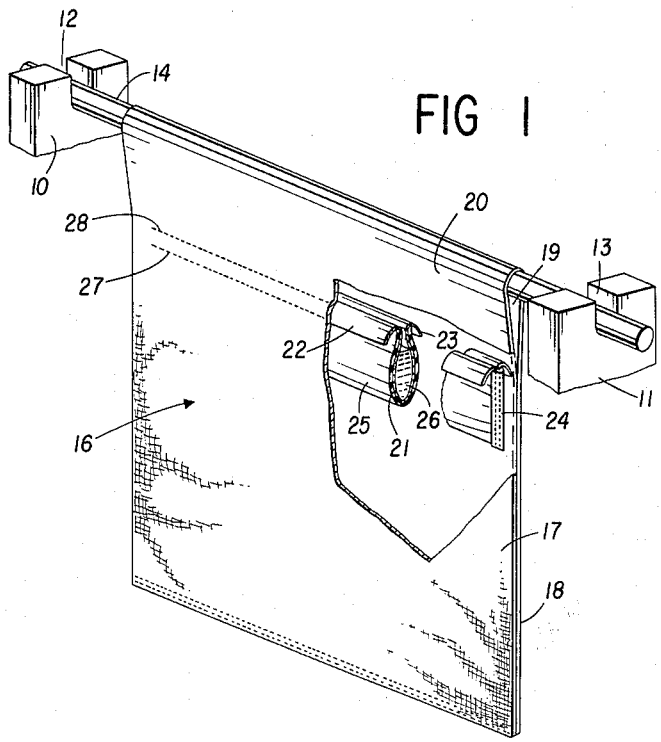
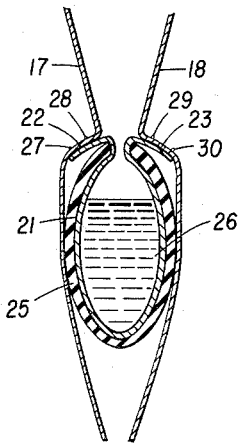
INVENTOR.
James N. McLaughlin
BY
Attorney 3,167,055
ANIMAL ACTUATED INSECTICIDE APPLICATOR
James N. McLaughlin, Monticello, Iowa
Filed Feb. 7, 1963, Ser. No. 256,936
3 Claims. (Cl. 119—157)

This invention relates in general to oilers and in particular to an oil applicator for animals.

Insects, such as flies, cause cattle and other animals much discomfort which results in the animals not gaining weight as fast as they should. Thus, if the cattle are sprayed or covered by insect repellant they are much more profitable.

It is an object of this invention, therefore, to provide an automatic animal oiler.

Another object is to provide an animal insecticide repellant applicator which can be operated by the animals.

A feature of this invention is found in the provision for a canvas repellant applicator which has a reservoir which wets the canvas with repellant through capillary action.

Further features, objects and advantages of this invention will become apparent from the following description and claims when read in view of the drawings in which:

FIGURE 1 is a partial cutaway perspective view of the animal oiler of this invention; and, FIGURE 2 is a sectional view showing the repellant tank of the invention.

As shown in FIGURE 1 a pair of supports 10 and 11 are formed with U-shaped openings 12 and 13 adjacent their tops and receive therein a support pipe or pole 14. The supports 10 and 11 might be attached to opposite sides of a door opening so that the pipe 14 extends across the opening above the heads and backs of the animals which are to use the device.

A repellant applicator 16 of canvas or other suitable fabric hangs over pipe 14 and has opposite sides 17 and 18. A loop 20 is formed at the top of applicator 16 and the pipe 14 extends through the opening 19 thus formed.

A tank 25 of neoprene or other impervious material is attached to the applicator. Tank 25 is lined with a lining 21 of absorbent material which has ends 22 and 23 which extend above the tank 25. End 22 is sewed to the side 17 of the applicator by seams 27 and 28. End 23 is sewed to side 18 by seams 29 and 30 as shown in FIGURE 2.

The ends 24 of tank 25 are closed and sealed.

In operation, the end of loop 19 is turned back and about three gallons of insect repellant is poured into tank 25. The lining 21 is an absorbent material and will transfer some of the liquid to the canvas sides 17 and 18 by capillary action. It is to be noted that ends 22 and 23 are in intimate contact with canvas sides 17 and 18 to supply repellant to them.

Although various liquid repellants may be used one sold under the trade name, Korlan, by Dow Chemical Company works very well for beef cattle.

The wick action keeps the canvas moist but does not make it so wet that the repellant drips to the floor and is wasted. When animals pass through the doorway they brush the canvas back with their heads and the canvas rubs against their heads and their backs as they pass through the doorway, thus applying a coating of repellant to them.

Although this invention has been described with respect to a preferred embodiment it is not to be so limited as changes and modification may be made which are within the full intended scope as defined by the appended claims.

I claim:

1. An animal oiler comprising a sheet of flexible material which is folded to form a loop and two downwardly extending portions, an elongated plastic insecticide tank attached between the sheet adjacent the loop and extending the length therealong, and a wick extending from inside the plastic tank and comprising a lining in contact therewith and secured to the two downwardly extending portions to feed insecticide to them by capillary action.

2. In apparatus according to claim 1 wherein the loop comprises a supporting means.

3. In apparatus according to claim 1 wherein the tank is constructed of neoprene.

References Cited by the Examiner

UNITED STATES PATENTS

| | | | |
|---|---|---|---|
| 974,042 | 10/10 | Dresback et al. | 119—157 |
| 1,999,122 | 4/35 | Clark et al. | 119—157 |
| 1,999,123 | 4/35 | Clark et al. | 119—157 |
| 2,702,020 | 2/55 | Worden | 119—157 |
| 2,835,225 | 5/58 | Cline | 119—157 |
| 2,998,803 | 9/61 | Worden | 119—157 |
| 3,046,942 | 7/62 | Hale | 119—157 |
| 3,116,717 | 1/64 | Ragsdale | 119—157 |

SAMUEL KOREN, Primary Examiner.

ALDRICH F. MEDBERY, Examiner.